United States Patent

[11] 3,556,126

| | | |
|---|---|---|
| [72] | Inventor | Lawrence E. Oswald |
| | | Ferriday, La. |
| [21] | Appl. No. | 776,887 |
| [22] | Filed | Nov. 19, 1968 |
| [45] | Patented | Jan. 19, 1971 |
| [73] | Assignee | Ashland Oil & Refining Company |
| | | Houston, Tex. |
| | | a corporation of Kentucky |

[54] PIPELINE VALVE CONTROL SYSTEM
7 Claims, 3 Drawing Figs.

[52] U.S. Cl.............................................. 137/118, 137/117
[51] Int. Cl. ................................................ G05d 11/13
[50] Field of Search........................................... 137/118, 109, 115, 117

[56] References Cited
UNITED STATES PATENTS

| | | | |
|---|---|---|---|
| 3,322,136 | 5/1967 | Matta.............................. | 137/118 |
| 3,413,998 | 12/1968 | Vaughan......................... | 137/118 |

FOREIGN PATENTS

| | | | |
|---|---|---|---|
| 526,869 | 6/1931 | Germany......................... | 137/118 |
| 534,101 | 9/1931 | Germany......................... | 137/118 |

*Primary Examiner*—Douglas Hart
*Attorney*—Walter H. Schneider

ABSTRACT: A flow control system for regulating the flow in two output pipes which divide the flow of a single input pipe as the input flow varies so as to maintain the flow in one of the output pipes at an adjustable predetermined level. The electrical control system employs two electromagnetic valves of a complementary nature, i.e., one opens with an increasing signal while the other closes with an increasing signal. Depending on the magnitude of the demand and the magnitude of the input flow, one valve is held open as the other valve is controlled to satisfy the demand. A relay in the circuit senses the conditions of the valves and chooses which valve is to be controlled and which is to remain stationary.

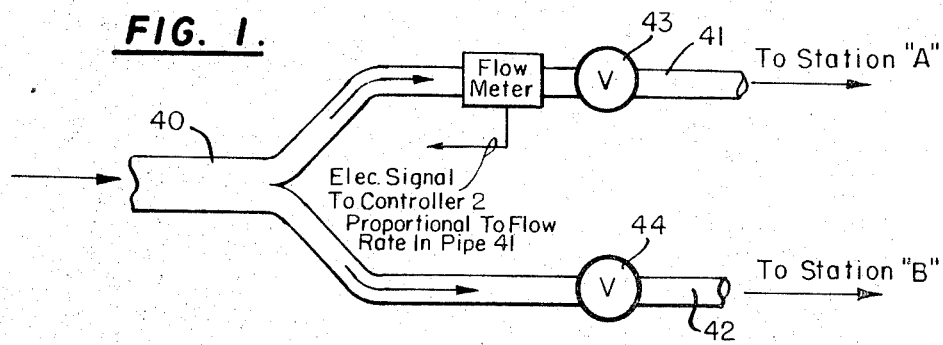
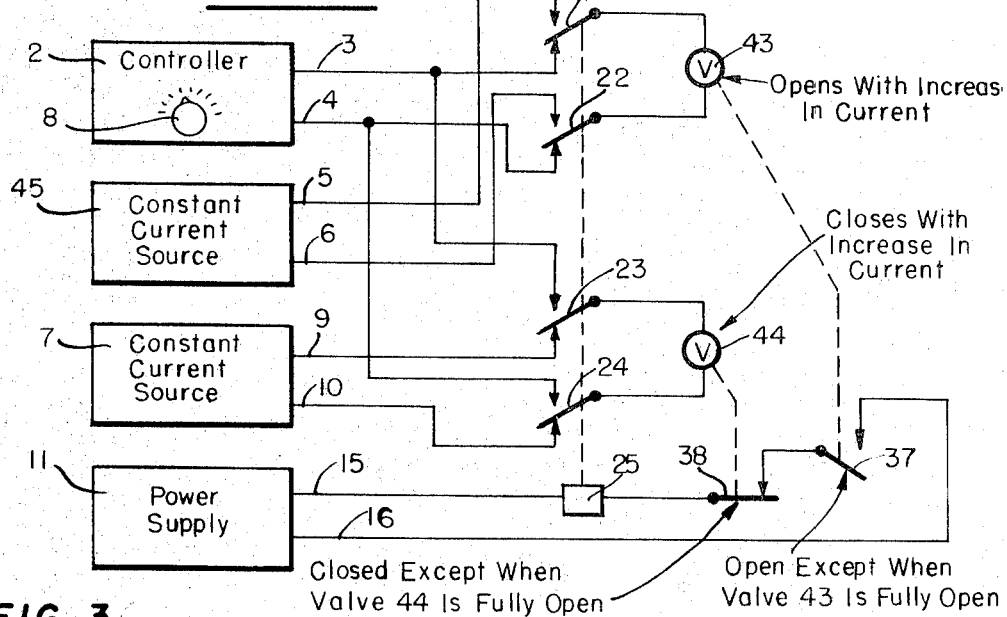
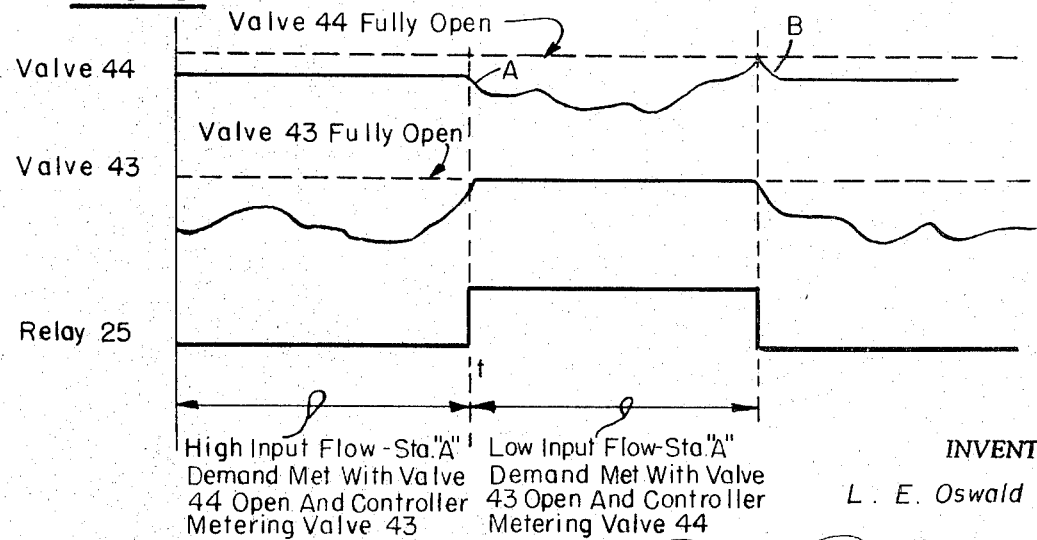

3,556,126

PIPELINE VALVE CONTROL SYSTEM

BACKGROUND OF THE INVENTION

The present invention is concerned with regulating the flow of fluid material so as to satisfy an adjustable predetermined demand, as the input flow to the system varies. Such a system can be used to supply a plurality of outputs from one input with one of the outputs controlled as required and the excess flow being delivered elsewhere.

Systems of this type are useful in a variety of applications. They may be used in pipeline delivery systems wherein one output flow is to be maintained at a predetermined level as the input varies. Such a system could also be used in hydraulic motors or the like as a regulating device to keep the speed of a hydraulic motor constant, for instance. In addition, a system of the type of the present invention can be used to control pressure rather than flow if so flow if so desired.

The system of this invention can also be used to control fluid pressure on two lines. Such pressure control systems are particularly useful where the flow is to be divided as on looped products lines where batching is done on different size lines. The pressure control system may be used to cause the interface at the end of the loop to arrive at the same time so as to prevent the mixing of products. Pressure control systems may also be used to maintain a predetermined maximum pressure on an old line, for example, while the remainder of the fluid is pumped at a higher pressure through a newer line which is better able to withstand the high pressure.

Prior art systems of this general type are deficient in a number of respects. They do not provide for a variable demand which is continuously variable and may be remotely controlled. Some systems use complicated valve structures which are expensive and difficult to maintain. The present invention solves these difficulties by employing only two simple electromagnetic valves and a control circuit which is inexpensive and easy to maintain.

SUMMARY OF THE INVENTION

The present invention provides a flow control system wherein the controlled flow is continuously variable over the entire range. Also, the present invention provides a flow control system wherein the controlled flow may be remotely and variably controlled.

A further object of the invention is to provide a flow control system which will automatically compensate for variations in input flow and which is simple, inexpensive and easy to maintain.

The variable flow input divides between two output pipes, in each of which the flow is controlled by a valve. Each valve is electrically controlled, with its degree of opening being responsive to the magnitude of an electrical signal applied thereto. One valve opens in response to an increase in signal, whereas the other closes in response to an increase in signal. A controller provides an output signal representative of the desired flow rate in a selected one of the output pipes, and this signal is applied to one or the other of the valves dependent upon the input flow rate. When the input flow rate is above a predetermined value, the controller signal is applied to the valve for the selected output pipe and the other pipe is maintained steady in a substantially full open position. The controller signal then meters the opening of the valve for the selected output pipe to maintain the selected flow rate.

When the input flow rate decreases to a level where the selected flow rate can no longer be maintained with the valve for the other pipe in the open position, such other valve is then suddenly made responsive to the controller signal while the valve for the selected output pipe is operated to and maintained in the fully open position. The system again reverts to the first-named operating condition when the input flow rate increases to the predetermined level.

BRIEF DESCRIPTION OF THE DRAWINGS

FIG. 1 shows, schematically, the control system of the present invention;

FIG. 2 is a circuit diagram of the control system of the present invention; and

FIG. 3 is a time diagram illustrating the conditions of valves 42 and 43 and also relay 25 under various operating conditions.

DESCRIPTION OF THE PREFERRED EMBODIMENT

FIG. 1 shows the input pipe 40, the controlled output pipe 41 with valve 43 controlling the flow, and excess output pipe 42 with valve 44 controlling its flow.

A variable flow of a fluid or gas in input pipe 40 is to be divided between output pipes 41 and 42 by means of control exercised over valves 43 and 44 respectively. The control is intended to maintain the flow in output pipe 41, for example, at an adjustable, predetermined level despite variations in flow rate in input pipe 40, with the excess flow going to output pipe 42.

FIG. 2 shows the circuit of the control system of the present invention. Conductors 3 and 4 are connected to a controller 2 which supplies an electric current whose amplitude is proportional to the demand in flow from controlled output pipe 41. Controller 2 can be manually operated or it can be automatically controlled in accordance with measured actual flow in the controlled output pipe. Conductors 3 and 4 connect the output signal of controller 2 to electromagnetic valve 43 through closed back contacts 21 and 22 of relay 25. Valve 43 is of the reverse action type, i.e. increasing current tends to open the valve permitting more flow.

Conductors 5 and 6 supply current from a suitable constant current source 45 to presently open front contacts 21 and 22. When relay 25 is operated to its energized position, under conditions discussed hereinafter, valve 43 will receive the output current from constant current source 45, and since this current is of relatively high amplitude, e.g. 20 milliamperes, valve 43 will be operated to the fully open position.

Conductors 9 and 10 supply current from another constant current source 7 through closed back contacts 23 and 24 to valve 44. Valve 44 is of the normal action type, i.e. increasing current tends to close the valve, decreasing the flow. The source 7 is designed to supply current of a relatively low amplitude which will keep valve 44 almost fully open, as long as relay 25 is dropped away. However, when relay 25 is energized, the output current of constant current source 7 is disconnected from valve 44 and this valve is then energized instead from controller 2 through closed front contacts 23 and 24 of relay 25.

Conductors 15 and 16 connect a suitable source of power 11 to relay operating coil 25 through complementary limit switches 37 and 38. Limit switch 37 is operatively connected to valve 43 and controlled thereby to be closed only when the valve is fully open. Limit switch 38 is operatively connected to valve 44 and controlled thereby, so that it is closed except when the valve is fully open.

With the system in the condition shown, valve 43 is controlled in accordance with the amplitude of signal received from controller 2. At the same time, valve 44 is almost fully open as called for by the low level of current from constant current source 7. As valve 43 varies its opening in response to the controller signal, valve 44 remains fixed. This type of operation is illustrated in the left-hand portion of FIG. 3. Thus, as long as the input flow is of an adequately high value, the predetermined flow rate to pipe 41 is maintained by keeping valve 44 open and controlling the condition of valve 43 in accordance with the amplitude of signal received from controller 2. Under these condition, limit switch 38 is closed, but so long as valve 43 is not required to be fully opened in order to meet the demand for pipe 41, limit switch 37 remains open and so relay 25 remains in its deenergized state.

If, in order to meet the predetermined demand at pipe 41, the controller signal is required to reach such a high value that valve 43 must be completely opened, the limit switch 37 will close, energizing relay 25, as indicated at time $t$ in FIG. 3. This action connects the controller 2 output signal to valve 44 so as to adjust its position in accordance with the amplitude of that signal. As a result, valve 44 starts to close as indicated at A in FIG. 3, thereby increasing the available flow to pipe 41. At the same time, the signal from constant current source 45 is applied to valve 43 which is then controlled to remain at the full open condition. Under these conditions, i.e. with valve 43 fully open and valve 44 not fully open, both contacts 37 and 38 remain closed so that relay 25 remains in the energized state.

As valve 44 closes, the flow through pipe 42 decreases, increasing the flow in pipe 41, which is the action desired. When the desired flow through pipe 41 is reached, valve 44 comes to some intermediate steady position. As the supply in pipe 40 varies, valve 44 will be modulated by the signal from controller 2 to supply the demand of pipe 41 as shown in the center portion of FIG. 3.

Assuming that either the demand from pipe 41 decreases to such a level that valve 44 becomes fully open, or that the input flow rate increases again to a higher level which also causes valve 44 to become fully opened, the following occurs: Opening of valve 44 opens limit switch 38, which causes relay 25 to be deenergized. This again connects the output of constant current source to valve 44 and also connects the output from controller 2 to valve 43. At the moment of operation of relay 25, the signal from controller 2 has necessarily been of a low amplitude, and therefore valve 43 closes rapidly. As soon as valve 43 begins to close, limit switch 37 opens, ensuring that relay 25 will not again be energized which could lead to an oscillating condition. Valve 44, which was fully open, is now controlled by constant current source 7 again, which closes it just enough (as shown at B in FIG. 3) to close limit switch 38.

The valves 43 and 44 and their respective energizing signals are designed so that limit switch 37 opens prior to the closing of switch 38. As valve 43 closes in response to controller signal, the flow in pipe 41 decreases as required to a steady value and now the demand of pipe 41 is supplied by modulating valve 43 while valve 44 remains stationary. Relay 25 is now ready to be energized, as required to meet the demand for pipe 41.

From the operation described above, it is clear that the output of pipe 41 is controlled to satisfy the demand as the input to pipe 40 varies or as the demand varies or both. Excess flow is conducted through pipe 42.

It is contemplated that variations in flow rate and also speed of valve operations will be quite slow, so that variations in output can be compensated for the exercise of manual control. To that end, FIG. 2 shows the controller 2 as being provided with a manual control knob 8 which may be adjusted in position to vary the output signal in response to observed variations in flow rate through pipe 41, which flow rate may, of course, be monitored by a conventional flow meter (not shown). It is, of course, also within the scope of the invention to provide that such a flow meter will provide a variable signal which may be employed as a feedback to controller 2 to provide for automatic control of the output signal of the controller.

I claim:

1. A variable demand fluid delivery system including a first input pipe and second and third output pipes;

each said output pipe having a valve therein responsive to a control signal for controlling the output flow in the respective pipe;

and control means for applying a respective control signal to each said valve for controlling both said valves to maintain an adjustable predetermined flow rate in said second pipe and with the excess going to said third pipe as the input flow rate in said first pipe varies;

one of said valves opening as the control signal applied thereto increases and the other said valve closing as the control signal applied thereto increases;

said control means including a controller providing a variable signal whose amplitude is representative of said predetermined flow rate for said second pipe and first and second constant amplitude signal sources providing signals of respectively different amplitude; and said control means at times coupling said controller to said one valve and said first signal source to said other valve and at other times coupling said controller to said other valve and said second signal source to said one valve.

2. The system of claim 1 in which said valves are both responsive to an electric current and both said first and second signal sources are constant current sources.

3. The system of claim 1 wherein both said first and second signal sources when connected at different times respectively to said other valve and said one valve are effective to control said valves to substantially their open positions.

4. The system of claim 2 in which said control means further includes a first electrical contactor which is open except when said one valve is fully open and a second electrical contactor which is closed except when said other valve is fully open, and means responsive to both said contactors being closed for connecting said one valve to said second signal source and said other valve to said controller.

5. The system of claim 4 in which said responsive means includes an electromagnetic relay.

6. A control system for regulating the flow of a fluid from a source to two outlets in such manner as to maintain an adjustable predetermined flow in a first of said outlets while the excess flow goes to the second outlet comprising:

an electrically controllable valve for each outlet regulating the flow from the respective outlet, each said valve being operable between open and closed positions in response to the magnitude of an electrical signal applied thereto;

said valve for said first outlet opening with an increase in signal and said valve for said second outlet closing in response to an increase in signal;

a controller for providing an electrical signal representative of the desired flow rate for said first outlet;

means for controlling the amplitude of signal provided by said controller;

a first signal source providing a first signal of constant amplitude for operating said valve of said second outlet to a substantially fully open condition when applied thereto;

a second signal source providing a second signal of constant amplitude for operating said valve of said first outlet to fully open condition when applied thereto;

means responsive to said two valves for coupling said controller to said valve for said first outlet and said second signal source to said valve for said first outlet until said control signal becomes of such increased magnitude as to fully open said valve for said first outlet; and said responsive means thereafter coupling said controller to said valve for said second outlet and also coupling said second signal source to said valve for said second outlet until said control signal becomes of such reduced magnitude as to operate said valve for said second outlet to its fully open condition.

7. A control system for regulating the flow of a fluid from a source to two outlets in such manner as to maintain an adjustable predetermined flow rate in a first of said outlets while the excess goes to the second outlet, said system comprising:

a control signal source generating a control signal of continuously variable amplitude representative of said predetermined flow rate;

first and second continuously variable control valves operatively associated with said first and second outlets respectively to regulate the flow from each such outlet and with each said control valve being responsive to the amplitude of a signal applied thereto;

said first valve being of the type which opens with increasing amplitude of the signal applied thereto and said second valve being of the type which closes with increasing amplitude of the signal applied thereto;

control means responsive to the operated conditions of said control valves and being operable between distinctively different first and second conditions;

said control means in its first condition operatively connecting said control signal to said first control valve while concurrently maintaining said second control valve in a substantially fully open position; and said control means in its second condition operatively connecting said control signal to said second control valve while concurrently maintaining said first control valve in a substantially fully open position.